United States Patent [19]

Moore et al.

[11] Patent Number: 5,593,728
[45] Date of Patent: Jan. 14, 1997

[54] INTERFACE COATING FOR CERAMIC FIBERS

[75] Inventors: Arthur W. Moore, Strongsville; Michael Dowell, Hudson, both of Ohio

[73] Assignee: Advanced Ceramics Corporation, Cleveland, Ohio

[21] Appl. No.: 332,924

[22] Filed: Nov. 1, 1994

[51] Int. Cl.$^6$ ............................ C23C 16/34; C23C 16/52; C04B 35/58
[52] U.S. Cl. ........................ 427/255.2; 427/255; 501/97; 501/96; 501/95; 501/56
[58] Field of Search .................... 501/56, 7, 8, 9, 501/95, 96, 97; 427/255, 255.2

[56] References Cited

U.S. PATENT DOCUMENTS

| | | | |
|---|---|---|---|
| 3,152,006 | 10/1964 | Basche | 427/255.2 |
| 3,676,343 | 7/1972 | Dietz | 252/25 |
| 4,642,271 | 2/1987 | Rice | 428/698 |
| 4,772,304 | 9/1988 | Nakae et al. | 65/18.2 |
| 5,032,551 | 7/1991 | Tashiro et al. | 501/95 |
| 5,275,844 | 1/1994 | Moore | 427/255.2 |
| 5,324,690 | 6/1994 | Gelatos et al. | 437/236 |

FOREIGN PATENT DOCUMENTS 2097417  9/1988  Japan ...................... 427/255.2

OTHER PUBLICATIONS

M. Maeda; "Effect of Oxygen Doping into SiBN Ternary Film"; Japanese Journal of Applied Physics; vol. 29; No. 9; pp. 1789–1794 (1990).

M. Maeda and T. Makino; "Low Dielectric Constant Amorphous SiBN Ternary Films Prepared by Plasma Enhanced Deposition"; Jap. Journal Applied Physics; vol. 26 No. 5 pp. 660–665 (1987).

Primary Examiner—Karl Group
Assistant Examiner—Louis M. Troilo
Attorney, Agent, or Firm—Eugene Liberstein; Michael N. Meller

[57] ABSTRACT

An improved interface coating for a fibrous material composed of a silicon-containing boron nitride having the general composition $BSi_xN_{1+1.33x}$, and containing from 2 wt % to 42 wt % of silicon, with substantially no free silicon present. The coating is formed by CVD using reactant vapors of ammonia and a gaseous source of both boron and silicon which flow into the furnace chamber at a controlled flow ratio to nitride the deposit to form the complex coating.

4 Claims, No Drawings

INTERFACE COATING FOR CERAMIC FIBERS

FIELD OF THE INVENTION

The present invention relates to an improved interface coating for ceramic fibers, particularly fiber-reinforced ceramic composites, and to a process for forming an interface coating for ceramic fibers to provide oxidation protection at elevated temperatures extending to 1500° C. and hydrolysis protection.

BACKGROUND OF INVENTION

The high mechanical strength properties of ceramic fibers and their resistance to chemical attack have made ceramic fibers attractive for use in a variety of applications, such as reinforcement materials for aircraft engine parts and aircraft structures, as well as combustors and radiative burning parts. However, to retain their desirable properties in oxidizing environments, it is necessary to coat the fibers with an interface coating to provide a surface which will keep the fibers distinct from the matrix with which the fibers form a composite. Stated otherwise, the fibers are intended to reinforce the matrix and, therefore, cannot diffuse into the matrix during processing. It is the ability of the fiber to be stressed independently of the matrix which imparts desirable ductility and fracture toughness to ceramic fiber composites. To maintain the fibers distinct from the matrix, the interface coating should function as a lubricant and exhibit only a weak mechanical bond to the matrix.

Currently, pyrocarbon and boron nitride are the most commonly used interface coatings for ceramic fibers in fiber-reinforced ceramic composites. Such coatings are chemically distinct from, and react little with, the principal reinforcing fibers, which are typically composed of silicon carbide, silicon nitride, aluminum oxides, and various metal silicates, and matrices, such as glass, metal oxide, silicon carbide, and silicon nitride. Pyrocarbon and boron nitride exhibit weak mechanical bonding to the matrix when applied to the fiber. However, both of these interface coatings are susceptible to relatively rapid oxidation at temperatures exceeding 1000° C., so that their use is limited to ceramic composites designed to operate below 1000° C. There is no commercially satisfactory interface coating suitable for sustained use above 1000° C. in oxidizing atmospheres, even though ceramic composites are generally regarded as refractory materials. Boron nitride coatings, which have a higher temperature capability than pyrocarbon coatings in oxidizing atmospheres, are also subject to attack by moisture.

Although ceramic fibers and matrices exist which retain their mechanical properties in oxidizing environments at temperatures exceeding 1000° C., fiber-reinforced composites which can withstand the same conditions have not yet been developed for lack of a suitable interface coating. Accordingly, there is a need for an interface coating which performs well under these conditions.

SUMMARY OF THE INVENTION

It has been discovered in accordance with the present invention that a silicon containing boron nitride coating having the composition $BSi_xN_{1+1.33x}$, hereinafter referred to as PB(Si)N, forms an interface coating for ceramic fibers for use in fiber-reinforced ceramic composites. The PB(Si)N interface coatings are particularly suitable for coating non-oxide fibers consisting mainly of silicon carbide or silicon nitride, in that they provide good debonding characteristics. The silicon-containing boron nitride coatings of the present invention are better than conventional boron nitride interface coatings in their resistance to oxidation at elevated temperatures and in their resistance to moisture pick-up at room temperature. At the same time, the silicon-containing boron nitride coatings of the present invention mechanically debond from the fiber, which promotes fracture toughness in the composite. In accordance with the present invention, the preferred method for forming the silicon-containing boron nitride coatings of the present invention is to pyrolytically codeposit boron nitride and silicon nitride, under controlled deposition conditions, to form the general composition, if stoichiometric, $BSi_xN_{1+1.33x}$.

The interface coating of the present invention comprise a glassy or amorphous structure of a silicon-containing boron nitride having the general composition $BSi_xN_{1+1.33x}$, and containing from 2 wt % to 42 wt % of silicon, with substantially no free silicon present. To satisfy these requirements of from 2 wt. % to 42 wt. % silicon with essentially no free silicon stoichiometry requires that silicon be present as the nitride, 3.33 to 69.93 wt. % $Si_3N_4$ and, as such, X must lie between 0.018 to 1.23, i.e. $0.018 < X < 1.23$.

The process of the present invention for forming a silicon-containing boron nitride coating on ceramic fibers comprises the steps of: placing the fibrous material to be coated within a furnace chamber of a reactor vessel; heating the atmosphere within the furnace chamber to a uniform temperature of between 1300° C. and 1750° C.; reducing the chamber pressure to between 0.1 and 1.5 Torr; introducing reactant vapors into said furnace chamber consisting essentially of ammonia and a gaseous source of both boron and silicon at a flow ratio to nitride the deposit forming a coating complex of PB(Si)N on said fibrous material having from 2 wt % to 42 wt % silicon, with substantially no free silicon.

DETAILED DESCRIPTION OF THE INVENTION

The interface coating of the present invention is achieved by codepositing silicon with boron nitride under conditions to nitride the silicon with essentially no free silicon present to form a pyrolytic (boron and silicon) nitride interface coating having the composition $BSi_xN_{1+1.33x}$, hereinafter referred to as PB(Si)N. The coating appears glassy or amorphous by x-ray diffraction and silicon and boron are uniformly distributed throughout the deposit. This interface coating resists oxidation and hydrolysis better than conventional boron nitride coatings and debonds well from fiber substrates including non-oxide silicon carbide or silicon nitride fibers. The term "silicon carbide fiber" includes any fiber which is used in continuous form (that is, the ratio of its length in use to its diameter exceeds 1000), and which is composed of at least 50% silicon and carbon by volume. These include, without limitation: Textron Specialty Materials Inc.'s SCS-series monofilaments made by a chemical vapor deposition process, in which SiC and other deposits are made on carbon or tungsten filament cores; Nippon Carbon Company's "Nicalon" and "Hi-Nicalon" polyfilament yarn produced by pyrolyzing polymer precursors which contain some free carbon, silicon oxide, and silicon oxycarbide phases; Ube Industries's "Tyranno Fiber" series of polyfilament yarns which contain additions of titanium and nitrogen to promote thermal stability; and Carborundum Company's SiC polyfilament yarn, which incorporates boron. Those skilled in the art will readily recognize that the term "silicon carbide fiber" tolerates other ceramic phases.

Conventional chemical vapor deposition may be used to deposit the interface coatings of the present invention using typical gas sources and deposition conditions for separately depositing boron nitride and silicon nitride, as known in the art, for example, pyrolytic boron nitride may be separately formed on a free-standing structure by the thermal decomposition of boron trichloride and ammonia vapors at a reaction temperature of between 1450° C. and 2300° C. In accordance with the present invention, pyrolytic boron nitride may also be codeposited with silicon under controlled conditions of gas flow rate and deposition temperature to form an interface codeposited coating complex of PB(Si)N containing essentially no free silicon. The interface coatings of the present invention do not show distinct x-ray diffraction peaks, and so are considered to have a glassy or amorphous structure. Silicon is distributed uniformly throughout the deposit. Useful interface coatings have silicon contents in the range 5 wt % to 42 wt %. Coating thickness is required to be small in comparison with the diameter of the uncoated fiber, in order to minimize the volume of coating phase in the final composite, while protecting the filaments from oxidation, hydrolysis and damage from textile-handling operations. Thus, for example, individual filaments of ceramic-fiber yarn, which have diameters 8μ to 15μ, require coatings 0.1μ to 0.8μ thick, and more preferably 0.3μ to 0.6μ thick. Ceramic monofilaments having thicknesses ≈150μ thick, however, receive coatings 1μ to 12μ thick, and more preferably 4μ to 9μ thick.

The interface coatings are deposited in a furnace chamber of a reactor vessel at chamber pressures of 0.1 to 1.5 Torr, with chamber pressures of 0.1 to 0.3 being preferred, for continuous coating of yarns. The preferred deposition temperature range is between 1300° C. and 1750° C., with the temperature range of 1300° C. to 1450° C. preferred for coating yarn bundles. Coatings can be applied in a batch process, as is well known, or to a moving array of filaments, as is described by A. W. Moore Mats. Res. Soc. Symp. Proc. 250, 269(1992). Batch CVD processing is used to coat yarns and monofilaments of indefinite length.

Although the source gases for boron and silicon are not critical, the preferred source gases are boron trichloride ($BCl_3$), trichlorosilane ($HSiCl_3$), and ammonia ($NH_3$). Less desirable boron sources include boron trifluoride or diborane, and less desirable sources of silicon include dichlorosilane and silicon tetrachloride. Coatings are usually deposited with no diluent other than excess ammonia, but argon or nitrogen can be used as diluents. Hydrogen can also be used as a diluent. In order to nitride the deposit, one desires the ratio $(NH_3)/(BCl_3+HSiCl_3)$ to be in the range 1.3 to 3.0, and more preferably in the range 1.5 to 2.5, in which the formulas denote gas flow rates. When these gases are used with or without inert diluents, the desired range of interface coating compositions is attained if trichlorosilane accounts for a mole fraction of the inlet gases in the range 0.05 to 0.2, and if the ratio of gas flow rates $0.2<(BCl_3)/(BCl_3+HSiCl_3)<0.5$.

Interface coatings produced by the present invention contain silicon tied to the boron and nitride in a compositional relationship $BSi_xN_{1+1.33x}$, with essentially no free silicon present in the coating. The content of silicon may vary between 2 wt % silicon and 42 wt % silicon, with the preferred silicon content in excess of 5 wt %, and being based on the rate of oxidative weight loss for a given temperature.

The following Table 1 compares oxidative weight losses for PBN and PB(Si)N coatings. When exposed to pure flowing oxygen at 1200° C. for 12 hours, pure PBN coatings experience a weight loss ≈4.3 mg/cm²-hour. PB(Si)N coatings, which contain 5 wt % silicon, experience weight losses ≈0.14 mg/cm²-hour, and coatings which contain 42 wt % silicon experience weight losses <0.003 mg/cm²-hour. Rates of oxidative weight loss are thus decreased by factors of 30 to 1,430 by incorporation of silicon in the coating, thereby extending the useful time at a given temperature.

TABLE 1

| | Oxidative Weight Losses of PBN and PB(Si)N | | |
|---|---|---|---|
| Sample | Silicon Wt % | 12-hour weight loss, 1200° C., Oxygen mg/cm²-hour | 12-hour weight loss, 1510° C., Air mg/cm²-hour |
| 8926 | 0 | 1.460 | |
| 9409-2 | 0 | 4.600 | |
| 1 | 0 | | 36.00 |
| 9409-1 | 0 | 4.000 | |
| 2 | 2 | | 6.00 |
| 8924 | 5 | 0.140 | |
| 3 | 15 | | 2.00 |
| 8933 | 16 | 0.007 | |
| 4 | 18 | | 0.40 |
| A293 | 23 | 0.054 | |
| 6 | 26 | | 0.03 |
| 9001 | 33 | 0.044 | |
| 9412-2 | 36 | 0.064 | |
| 9412-1 | 36 | 0.057 | |
| 9413-1 | 42 | 0.003 | |

Since the thickness of interface coatings is less than 1μ, Table 1 shows that exposed pure BN coatings would be entirely consumed in 7 minutes 12 1200° C. in oxygen, and in less than one minute at 1510° C. in air. Or, if an array of fiber ends at the edge of a composite were exposed to the same environments, pure PBN interface coatings would recede at a rate of 1 cm/hour at 1200° C. in oxygen and at a rate of 20 cm/hour at 1510° C. in air. They are not suitable for extended use in such environments. But PB(Si)N coatings containing only 5 wt % silicon experience much smaller weight losses at 1200° C., and coatings containing as little as 18 wt % silicon experience similarly small weight losses at 1510° C., providing a duration of hours for exposed fiber coatings or recession rates far less than 1 cm/hour for coatings on exposed fiber ends. The most preferred range of compositions, from this viewpoint, is 15 wt % to 40 wt % silicon.

PB(Si)N interface coatings of the present invention also resist moisture better than conventional PBN coatings, which hydrolyze to form borates by reactions such as:

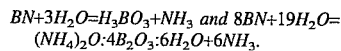

$$BN+3H_2O=H_3BO_3+NH_3 \text{ and } 8BN+19H_2O= (NH_4)_2O:4B_2O_3:6H_2O+6NH_3.$$

This hydrolysis is undesirable for two reasons. First, it consumes the interface layer, which is typically about 0.5μ thick and is necessarily much thinner than a ceramic fiber, so that it can no longer act as an interface between the fiber and the matrix. When the interface layer is consumed, the composite loses its fracture toughness and its ability to fail gracefully. Second, it introduces borates which can react with oxide matrices or fibers at elevated temperatures, thereby changing their structural properties. Table 2 compares the weight gains experienced when three interface coating deposits were powdered, exposed to 95% relative humidity at room temperature for 120 hours, and dried at 150° C. for four hours in flowing dry nitrogen. Whereas the pure PBN deposited at 1080° C. had an initial oxygen content of 14 wt % and experienced a weight gain of 9% due to hydrolysis, and pure PBN deposited at 1400° C. had an initial oxygen content of 0.56 wt % and experienced a weight gain of 3.2% due to hydrolysis, PB(Si)N containing 36 wt % silicon deposited at 1400° C. had an initial oxygen content only 0.35 wt % and experienced a weight gain of only 0.3%. Thus, the decisively lower oxygen contents and hydrolysis rates of the PB(Si)N interface coatings mark them as a better choice than pure BN interface coatings in practical applications such as combustors, radiative burning tubes and turbine parts, in which fiber-reinforced ceramic composites are exposed to moisture and also to hot oxidizing atmospheres.

Interfacial shear strengths of PB(Si)N-coated silicon carbide fibers in a silicon carbide matrix are 20 MPa to 30 Mpa, comparable to but somewhat lower than those of pure PBN coatings. Values in this range indicate good debonding properties. Scanning electron micrographs of the interface clearly show that a PB(Si)N coating having ≈20 wt % silicon debonds readily from a silicon carbide monofilament fiber formed by chemical vapor deposition (Textron Specialty Materials, Fiber SCS-0).

Desirable debonding properties of the present coatings are attributable to a large difference in thermal expansion between coating and fiber. Thermal expansions to 1500° C. of SiC (the fiber substrate for much of this work), PB(Si)N, and PBN are respectively 0.72%, 025% to 0.35%, and 0.25%. Since the differences in thermal expansion exceed 0.20%, thermal strains can overcome the relatively weak attraction between these coatings and the substrate. In fact, these coating always spalled from flat plates of polished silicon carbide and from SiC tubes approximately one-inch in diameter, and intact coatings could be obtained only on the fibers, which were 150μ in diameter or smaller. When interface coatings are applied to fibers having a diameter of 25μ or smaller, which generally are used as multifilament yarns or tows, debonding is also promoted by differential thermal contraction within the coating. As PBN and PB(Si)N, which are somewhat anisotropic, are cooled from the deposition temperature, differences in radial and circumferential expansion produce internal stresses in the coating. Laminar cracks appear in the coating or at the coating-fiber interface near a ratio of coating thicknesses to fiber radius approximately 0.04 [L. F. Coffin, Jr., *J. Am. Ceramic Soc.*, 47, 473 (1964)], thereby debonding the fiber from the matrix at the coating interface. For a fiber of 15μ diameter, such as Nippon Carbon Company's "Nicalon" or "Hi-Nicalon," interface coatings have inherently weak interfaces when the thickness exceeds approximately 0.3μ. Thicker coatings are generally preferred to protect the fiber from damage during ceramic processing.

Oxidation and hydrolysis results are shown in the following table:

TABLE 2

Hydrolysis of PBN and PB(Si)N Compositions

| Sample | Deposition Temperature °C. | Silicon Wt % | Oxygen Wt % | Increases After Humidification and Drying, Wt % |
|---|---|---|---|---|
| A | 1080 | 0 | 14.0 | 9.0 |
| 9409 | 1400 | 0 | 0.56 | 3.2 |
| 9412 | 1400 | 36 | 0.36 | 0.3 |

The following Tables 3 and 4 show the process conditions and oxidative weight loss rates at 1200° C. in oxygen and the continuous coating properties for a Hi-Nicalon yarn ceramic fiber at varying silicon concentrations, respectively.

TABLE 3

Process Conditions and Oxidative Weight Losses of PBN and PB(Si)N Coatings
Weight Loss Rates at 1200° C. in Oxygen

| Specimen | Silicon Wt % | Temperature Degrees C. | P Torr | BCl Flow l/min | NH Flow l/min | HSiCl₃ Flow l/min | Diluent Flow l/min | Diluent Weight Loss Rate mg/cm-hour |
|---|---|---|---|---|---|---|---|---|
| 9409 | 0 | 1400 | 0.25 | 0.52 | 1.48 | 0.00 | 4.00 Ar | 4.300 |
| 8924 | 5 | 1400 | 1.60 | 0.65 | 2.19 | 0.10 | 5.36 H₂ | 0.140 |
| 9412 | 36 | 1400 | 0.12 | 0.44 | 1.51 | 0.35 | 0.00 | 0.061 |
| 9413 | 42 | 1400 | 0.12 | 0.39 | 1.47 | 0.44 | 0.00 | 0.003 |

TABLE 4

Continuous Coating of Hi-Nicalon Yarn

| Run No. | Silicon Wt %[1] | Temperature Degrees C. | P Torr | BCl Flow l/min | NH Flow l/min | HSiCl₃ Flow l/min | Ar Flow l/min | Coating Thickness[2] um | Deposition Time min |
|---|---|---|---|---|---|---|---|---|---|
| 9435A | 0 | 1400 | 0.22 | 0.45 | 1.4 | 0.00 | 1.2 | 0.5–0.7 | 38 |
| 9435B | 23 | 1400 | 0.25 | 0.45 | 1.4 | 0.22 | 0.0 | 0.4–0.6 | 34 |
| 9435C | 39 | 1400 | 0.25 | 0.45 | 1.4 | 0.42 | 0.3 | 0.4–0.6 | 37 |

[1]Determined from mole fraction HSiCl₃ in inlet gas
[2]Determined from weight gain during coating The following examples illustrate the invention:
1. Resistance of BN and PB(Si)N coatings to oxidation and hydrolysis at temperatures less than 1000° C. was compared. PBN specimen A containing no silicon was deposited at 1080° C. at a pressure of 0.25 Torr from a gas mixture consisting of BCl₃ (0.5 l/min and NH₃ (1.5 l/min)in a volume of 5.5 liters. A second PBN specimen 9409 containing no silicon was deposited at 1400° C. at a pressure of 0.25 Torr from a gas mixture consisting of BCl₃ (0.52 l/min), NH₃ (1.48 l/min) and Ar (4 l/min) in a volume of 5.5 liters. Then a PB(Si)N specimen 9412 containing 36 wt % silicon was deposited at 1400° C. at a pressure of 0.115 Torr from a gas mixture consisting of BCl$_3$ (0.44 l/min, NH$_3$ (1.51 l/min), and HSiCl$_3$ (0.35 l/min). Oxidation and hydrolysis results are shown in Table 2. PBN specimen A deposited at 1080° C. achieved an oxygen content 14.0 wt % prior to hydrolysis, and gained an additional 9.0 wt % after humidification and drying. PBN specimen 9409 deposited at 1400° C. achieved an oxygen content 0.56 wt % prior to hydrolysis, and gained an additional 3.2 wt % after humidification and drying. PB(Si)N specimen 9412, which contained 36 wt % silicon, achieved an oxygen content 0.36 wt % prior to hydrolysis, and gained an additional 0.3 wt % after humidification and drying. Codeposition of silicon thus reduces the oxygen uptake of the coating compared to that of pure PBN deposited at the same temperature, and greatly reduces the weight gain due to hydrolysis.

2. Resistance of BN and PB(Si)N coatings to weight loss in pure oxygen at 1200° C. was compared using bulk specimens, weight losses and areas of which could readily be determined. Process conditions and results are shown in Table 3. PBN specimen 9409 los weight at an average rate 4.3 mg/cm$^2$-hour. PB(Si)N specimen 8924, which contained 5 wt % silicon, lost 0.14 mg/cm$^2$-hour. PB(Si)N specimen 9412, which contained 35 wt % silicon, lost 0.061 mg/cm$^2$-hour, and specimen 9413, which contained 42 wt % silicon, lost 0.003 mg/cm$^2$-hour. Dramatic decreases in thermal oxidation rate were thus obtained by using only 5 wt % silicon, and the decreases continued until the composition was 42 wt % silicon.

3. Silicon carbide monofilaments having a nominal diameter of 140μ (Textron Specialty Materials, Inc., Grade SCS-0) were coated either with PBN or with PB(Si)N at 1400° C., using flow rates 0.5 lBCl$_3$/min and 1.5 lNH$_3$/min for 2.5 minutes. Pure PBN specimen 9436, made at a pressure of 0.1 Torr, had a thickness of 0.7μ at a particular location in the reaction chamber. The pure PBN coatings of this run exhibited good debonding from the fiber. PB(Si)N specimen 9437 was made by addition of 0.22 lHSiCl$_3$/min, which raised the pressure to 0.14 Torr, under otherwise identical conditions for the same deposition time of 2.5 minutes. The expected coating composition for the mole fraction HSiCl$_3$ in the gas phase is 5 wt %. The coating thickness at the same location in the furnace was 0.9μ. Coating thickness, and debonding of the coating from the SiC substrate, are shown in FIG. 1 for filaments coated at four different positions in the furnace. Another group of SiC filaments was coated for three minutes at 1400° C. at a pressure of 0.15 Torr using flow rates 0.35 lBCl$_3$/min, 1.5 lNH$_3$/min, and 0.42 lHsiCl$_3$/min. The expected coating composition for this mole fraction HSiCl$_3$ in the gas phase is 41 wt % silicon. Coating thickness at the same furnace location was 3.7μ to 4.3μ, and the coatings exhibited good debonding characteristics. These experiments show that SiC monofilaments can be coated with PB(Si)N coatings at approximately the same deposition rate as PBN coatings deposited under comparable conditions, and exhibit suitable debonding characteristics. Measurements of interfacial shear strength by the fiber push-out method show that PB(Si)N coatings which have 5 wt % to 40 wt % silicon have shear strengths of 10 MPa to 20 MPa at room temperatures, while pure PBN coatings have shear strengths of 10μ to 30μ. These low shear strengths indicate good debonding, and this range of values is considered to be for all practical purposes identical for both groups.

4. Ceramic multifilament yarns can be coated with PB(Si)N interface coatings in much the same way that they can be coated with pure PBN. Thus in run (435, "Hi-Nicalon," an 1800 denier, 500 filament silicon carbide yarn produced by Nippon Carbon Company was passed continuously through a CVD furnace at 1400° C. at a yarn speed of 2.75 feet/minute, so that the residence time for coating deposition was 66 seconds. Gas flows were adjusted as shown in Table 4, and 90-foot sections of yarn were produced in which the nominal silicon content of the coatings was 0 wt % (9435A), 20 wt % (9435B), and 40 wt % (9435C). Coating thicknesses ranged from 0.4μ to 0.7μ; PBN coatings in this range of thickness are considered to be optimal for most purposes by those skilled in the art.

5. Ceramic yarns and monofilaments can be coated with interface coatings consisting of multiple layers. Thus in Run 9434, several lengths of Textron monofilament SCS-0 and several lengths of Nippon Carbon "Hi-Nicalon" yarn were coated in the same batch CVD process first with PBN at 1400° C. for six minutes, then with PB(Si)N in which the silicon content is approximately 30 wt % based on HSiCl$_3$ mole fraction in the inlet gas. Throughout the run, the chamber pressure was 0.17 Torr, the BCl$_3$ flow rate was 0.5 l/min and the NH$_3$ flow rate was 1.5 l/min. Trichlorosilane was supplied at 0.29 l/min to produce the PB(Si)N layer. Total coating thickness ranged from 3.3μ to 8.1μ on SCS-0 monofilaments, and from 2.4μ to 3.6μ on individual filaments of "Hi-Nicalon" yarn. Scanning electron micrographs of coated SCS-0 monofilaments showed that the PBN coating debonded readily from the SCS-0 substrate and that the PB(Si)N overcoating debonded readily from PBN. The PB(Si)N overlayers were approximately 2.5 times as thick as the PBN layer. This result shows that coatings consisting of multiple layers can be deposited, retaining desirable debonding characteristics, and that PBN layers can be overcoated by PB(Si)N to protect the PBN layer from hydrolysis and oxidation.

What we claim is:

1. A process for forming an interface coating on a ceramic fibrous material having a differential in thermal expansion of at least 0.2% to 1500° C. with respect to the ceramic fibrous material so as to enable the coating to mechanically debond from the fibrous material comprising the steps of: placing the fibrous material to be coated within a furnace chamber of a reactor vessel; heating the atmosphere within the furnace chamber to a uniform temperature of between 1300° C. and 1750° C.; reducing the chamber pressure to between 0.1 and 1.5 Torr; introducing reactant vapors into said furnace chamber consisting essentially of ammonia and a gas of boron trichloride and trichlorosilane at a flow rate in accordance with the following gas volume ratio:

$$\frac{NH_3}{BCl_3 + HSiCl_3} = 1.3 \text{ to } 3.0$$

so as to fully nitride a deposited material for forming a coating complex of BSi$_x$N$_{1+1.33x}$ where 0.018<x<1.23 on said fibrous material with a concentration of from 2 wt % to 42 wt % silicon and essentially no free silicon.

2. A process, as defined in claim 1, wherein said gas ratio range is between 1.5 and 2.5.

3. A process, as defined in claim 1, having a mole fraction of trichlorosilane to total gas volume in a range between 0.05 and 0.2.

4. A process, as defined in claim 3, having a volumetic gas flow ratio of 0.2<(BCl$_3$)/(BCl$_3$+HSiCl$_3$)<0.5.

* * * * *